US006180714B1

(12) United States Patent
Ohira et al.

(10) Patent No.: US 6,180,714 B1
(45) Date of Patent: Jan. 30, 2001

(54) GOLF BALL COATING COMPOSITION AND COATED GOLF BALL

(75) Inventors: Takashi Ohira; Susumu Muta; Hiroto Sasaki, all of Chichibu (JP)

(73) Assignee: Bridgestone Sports Co., Ltd., Tokyo (JP)

( * ) Notice: Under 35 U.S.C. 154(b), the term of this patent shall be extended for 0 days.

(21) Appl. No.: 09/455,158

(22) Filed: Dec. 6, 1999

(30) Foreign Application Priority Data

Dec. 7, 1998 (JP) .................................................. 10-346954

(51) Int. Cl.[7] .............................. C08J 3/00; C08K 3/20; C08L 75/00; C08G 18/00; C08G 18/08
(52) U.S. Cl. ........................... 524/590; 473/351; 473/378; 524/589; 528/44; 528/45; 528/48; 528/55; 528/58
(58) Field of Search ...................................... 524/589, 590; 528/44, 45, 48, 55, 58; 473/351, 378

(56) References Cited

U.S. PATENT DOCUMENTS 5,817,732 * 10/1998 Asahina et al. ......................... 528/45

* cited by examiner

*Primary Examiner*—Patrick D. Niland
(74) *Attorney, Agent, or Firm*—Sughrue, Mion, Zinn, Macpeak & Seas, PLLC

(57) ABSTRACT

A coating composition comprising a two-part curable urethane paint consisting essentially of a polyol and a polyisocyanate, a metal chelating agent having a boiling point of up to 200° C., and an organometallic compound as a curing catalyst is easy to apply to golf balls because of a long pot life and a short curing time.

11 Claims, No Drawings

GOLF BALL COATING COMPOSITION AND COATED GOLF BALL

This invention relates to a golf ball coating composition and a golf ball coated therewith.

BACKGROUND OF THE INVENTION

Among a variety of paints on golf balls, a polyurethane paint of the two-part curing type wherein polyol and polyisocyanate are mixed immediately before use is commonly adopted since it is resistant to substantial deformation, impact and friction.

As it is currently desired to increase the spin rate of golf balls, the cover has been made softer. In order to avoid any deformation of the soft cover during paint coat drying, it is now necessary to dry paint coats at lower temperatures. From the productivity standpoint, it is desired to reduce the curing time of paint in order that a series of coating steps from application to drying be finished in a short time.

One practice for improving the workability of paint (for example, low-temperature drying and time reduction) is to increase the amount of curing catalyst relative to the paint base. This is successful in promoting the curing reaction of the paint, but at the same time, reduces the pot life of the paint, inviting many drawbacks such as inefficient working and deterioration of the paint prior to application.

It is, therefore, desired to have a paint which has a satisfactory pot life and a short curing time and is thus improved in workability, and at the same time, forms a coat having improved characteristics including durability, water resistance and adhesion.

SUMMARY OF THE INVENTION

An object of the invention is to provide a golf ball coating composition which has a long pot life, contributes to improvements in workability and productivity in the manufacture of golf balls, and forms a coat of quality. Another object is to provide a golf ball of quality coated with the composition.

It has been found that when a two-part curable urethane paint consisting essentially of a polyol and a polyisocyanate is blended with a metal chelating agent having a boiling point of up to 200° C. and an organometallic compound as a curing catalyst, the metal chelating agent blocks the metal moiety of the organometallic compound to adjust its catalysis adequate so that the curing time of a coat may be substantially reduced without shortening the pot life. The golf ball manufacturing process can then be shortened. Coats resulting from this coating composition are of quality and consequently, golf balls coated therewith are also improved in quality.

The coating performance is further improved when a metal chelating agent having a boiling point of up to 150° C., more specifically acetylacetone or a fluorinated derivative thereof is used and when the metal moiety of the organometallic compound is tin or zinc. Additionally, the characteristics required as the golf ball coat including durability, adhesion, abrasion resistance and water resistance are improved. Coated golf balls of higher quality are obtainable.

Accordingly, the invention provides a golf ball coating composition comprising a two-part curable urethane paint consisting essentially of a polyol and a polyisocyanate, a metal chelating agent having a boiling point of up to 200° C., and an organometallic compound as a curing catalyst. A golf ball coated with the coating composition is also provided.

The golf ball coating composition of the invention is successful in significantly reducing the curing time required for coats to cure, at no sacrifice of the pot life. This leads to improvements in workability and productivity of the golf ball manufacturing process. After compounding, the coating composition is prevented from changing its properties. Golf balls coated with the coating composition have stabilized coat performance. Since the coats can be cured at lower temperatures, golf balls even with soft cover stock undergo no thermal deformation during the coating operation. Then golf balls with good appearance and high quality are obtained.

DESCRIPTION OF THE PREFERRED EMBODIMENTS

The golf ball coating composition of the invention is based on a two-part curable urethane paint consisting essentially of a polyol and a polyisocyanate.

The polyol component used herein may be a well-known one and selected from, for example, polyester polyols, acrylic polyols, and polyether polyols. Also useful are modified ones of these polyols, for example, acrylic-modified polyester polyols, polyester-modified acrylic polyols, and polyether-modified polyester polyols. The use of acrylic-modified polyols is especially preferred.

The polyisocyanate component used herein is not critical as long as it serves as a curing agent for the polyol component. For example, when weather resistance is taken into account, a non-yellowing type polyisocyanate (typically HMDI: methylenebis(4-cyclohexyl isocyanate)) may be selected. The polyisocyanate is not limited thereto and may be selected so as to meet the desired performance, from TDI (tolylene diisocyanate), XDI (xylylene diisocyanate), IPDI (isophorone diisocyanate) and HDI (hexamethylene diisocyanate), for example.

The coating composition of the invention is formulated by blending a metal chelating agent and an organometallic compound as a curing catalyst in the above-described two-part curable urethane paint. The metal chelating agent chelates or blocks the metal moiety of the curing catalyst to adjust its catalysis adequate so that the pot life may be prolonged.

The metal chelating agent used herein should have a boiling point of up to 200° C., and especially up to 150° C. If a chelating agent having a higher boiling point is used, some time is necessary for the agent to volatilize or evaporate during low-temperature drying, retarding the drying step.

As long as the metal chelating agent is effective for chelating the metal moiety of the organometallic compound, it may be selected from, for example, β-diketones, keto-esters, hydroxycarboxylic acids and esters thereof, keto-alcohols, and enolic active hydrogen compounds. These metal chelating agents can be used as the solvent for the paint. Of these, β-diketones such as acetylacetone and fluorinated derivatives thereof and keto-esters such as methyl acetoacetate and ethyl acetoacetate are preferable because they readily volatilize at low temperatures during the drying step (that is, have a low boiling point) and do not react with isocyanates. It is recommended to use acetylacetone and fluorinated derivatives thereof because of their low boiling point, low cost, and availability. The use of the metal chelating agent as the low-boiling solvent has the following advantages. First, the metal chelating agent blocks the metal moiety of the organometallic compound as the catalyst through chelate formation, thereby prohibiting the catalysis and extending the pot life. Secondly, since the solvent readily volatilizes at the drying temperature (above about 40° C.), the catalyst blockage is relieved during the drying step so that curing of the coat quickly takes place.

The amount of the metal chelating agent added may be determined as appropriate in accordance with the type thereof and the balance thereof with the organometallic compound and the two-part urethane paint. An appropriate amount of the metal chelating agent is about 0.1 to 10%, and preferably about 1 to 5% by weight based on the entire coating composition. Outside the range, lesser amounts of the metal chelating agent may insufficiently block the metal moiety of the organometallic compound, failing to extend the pot life. Excessive amounts of the metal chelating agent may take a long time to evaporate off, retarding the drying of an applied coat and reducing the working efficiency.

The coating composition of the invention uses an organometallic compound as the curing catalyst. There may be used organometallic compounds which are commonly blended as the curing agent in prior art two-part curable urethane paints.

Then, the organometallic compound used herein may be selected from a number of well-known ones. Those organometallic compounds having a metal soap structure within the molecule are recommended when the solubility in the above-described solvent is taken into account. Metal salts of octylic acid, naphthenic acid and lauric acid are preferably used when the price, availability, solubility in organic solvents, and colorability in solution form (less coloring in solution form) are taken into account. As to the metal moiety, organometallic catalysts based on zinc and tin are appropriate. Typical of the organometallic compound are zinc octylate, zinc naphthenate, and dibutyltin dilaurate.

The amount of the organometallic compound used as the curing agent is determined as appropriate depending on its type. For example, when a comparison is made between zinc catalysts and tin catalysts, the tin catalysts generally possess a higher catalytic activity than the zinc catalysts. Then the amount of the tin catalysts added to paint is smaller than the amount of the zinc catalysts. For example, an appropriate amount of zinc octylate is 0.03 to 0.8%, and preferably 0.05 to 0.5% by weight based on the entire coating composition whereas an appropriate amount of dibutyltin dilaurate is 0.0005 to 0.01%, and preferably 0.001 to 0.005% by weight based on the entire coating composition.

Understandably, the amount of the organometallic compound used as the curing catalyst must be adjusted in accordance with the type thereof. Outside the appropriate range, lesser amounts of the organometallic compound may fail to promot curing during the drying step whereas excessive amounts of the organometallic compound may require larger amounts of the metal chelating agent for appropriately blocking the catalytic activity and after drying, leave the catalyst in the dried coat to invite secondary detrimental effects such as yellowing.

In combination with the organometallic compound, any of various other catalysts may be used for adjusting the promoting effect, if desired.

The metal chelating agent and the organometallic compound used as the curing catalyst are blended in an appropriate proportion as described above. Often, it is preferred to set the weight ratio of metal chelating agent to organometallic compound at 2/1 to 5,000/1. For those catalysts whose metal moiety is zinc, the weight ratio is preferably from 2/1 to 70/1, and especially from 4/1 to 40/1. For those catalysts whose metal moiety is tin, the weight ratio is preferably from 20/1 to 5,000/1, and especially from 400/1 to 2,000/1. Outside the weight ratio range, there is a possibility that the coating properties necessary as the paint on golf balls are lost although the pot life is prolonged, or inversely, the pot life is shortened although the desired coating properties are obtained.

To the golf ball coating composition of the invention, any of conventional well-known paint additives may be added if necessary. For example, thickeners, UV absorbers, fluorescent brighteners, slip agents, and pigments may be added.

The golf ball coating composition of the invention is typically formulated by mixing the above-mentioned components with a suitable solvent to a nonvolatile concentration of about 15 to 60% by weight, and preferably about 25 to 45% by weight. The golf ball coating composition of the invention may be either a clear paint or an enamel paint with pigments added.

The golf ball coating composition of the invention can be prepared just prior to use by mixing the two parts, polyol and polyisocyanate, and simultaneously blending the metal chelating agent and the organometallic compound therewith. The mixing technique is not critical and well-known mixing techniques are employable. For example, the polyol part is premixed with the metal chelating agent and organometallic compound and on use, the premix is mixed with the polyisocyanate part.

The coating composition of the invention has a long pot life, as demonstrated by little change of viscosity even after 5 hours from the mixing of all components, ensuring improved coating operation.

According to the second aspect, the invention provides a coated golf ball, that is, a golf ball coated with the coating composition defined above. The golf ball to be coated may be any of well-known golf balls including one-piece golf balls, solid golf balls having a solid core enclosed with a cover, and wound golf balls having a wound core (consisting of a center and a thread rubber layer) enclosed with a cover.

In golf balls having a cover, the cover may be a single layer or a multilayer structure. The cover may be formed of either conventional cover stocks such as ionomer resins and balata rubber or thermoplastic elastomers which are developed in order to meet the recent demand for soft covers.

The coated golf ball is obtained by formulating the coating composition according to the first aspect of the invention to meet a particular golf ball which has been manufactured by a conventional process, and applying the coating composition to the surface of the golf ball by a conventional coating technique, followed by drying. The coating technique used herein may be spray coating, electrostatic coating, and dipping, for example.

The drying step may be the same as employed for conventional well-known two-part curable urethane paints. The coating composition of the invention is typically dried at a temperature of at least about 40° C., especially about 40 to 60° C. for a time of about 20 to 90 minutes, especially about 40 to 50 minutes. By properly selecting the components of the coating composition, its drying temperature can be set relatively low as previously mentioned. Then by making such an adjustment in accordance with a particular cover material, the deformation of the cover by high-temperature drying can be avoided. Since the solvent readily volatilizes and the curing of the coat rapidly proceeds, the curing time can be reduced.

The coat formed on the golf ball from the coating composition of the invention is improved in all of durability, adhesion, abrasion resistance and water resistance. Because of these coat properties, the coated golf ball is of excellent quality.

The golf ball coating composition of the invention is easy to apply because of it's long pot life and short curing time, and thus contributes to improvements in workability and productivity of the golf ball manufacturing process. Since an applied coating can be cured at relatively low temperatures, the invention fully complies with the recent demand for soft covers. The coated golf ball of the invention is a ball of excellent quality endowed with the coat properties of the coating composition.

EXAMPLE

Examples of the invention are given below by way of illustration and not by way of limitation.

Examples 1–10 and Comparative Examples 1–4

Coating compositions of clear or white enamel type were prepared by blending the ingredients shown in Tables 1 and 2, and applied to two-piece solid golf balls having an ionomer resin cover under the same conditions.

Paint Type

Clear paint: The ingredients were formulated to a solids content of about 30% by weight and a viscosity corresponding to 11 seconds as measured by the Iwata cup.

White enamel paint: The ingredients were formulated to a solids content of about 38% by weight (the pigment: about 43% of the solids) and a viscosity corresponding to 12.5 seconds as measured by the Iwata cup.

The coating compositions and the surface of the coated golf balls were examined by the following tests. The results are also shown in Tables 1 and 2.

Pot Life

In a 4-liter pail, a paint was prepared in accordance with the formulation shown in Table 1 or 2. The initial viscosity was about 11 seconds for clear paint and about 12.5 seconds for white enamel paint, as measured using the Iwata cup. With the pail closed, the paint was allowed to stand at room temperature (about 23° C.) while it was sampled out at intervals of one hour until 5 hours for viscosity measurement using the Iwata cup. Evaluation was made according to the following criterion.

Good: a viscosity change of less than 2 seconds after 5 hours

Fair: a viscosity change of less than 2 seconds after 2 hours and a viscosity change in excess of 2 seconds within 2 to 5 hours Poor: a viscosity change in excess of 2 seconds within 2 hours Coat Examining Tests (1) Adhesive tape test The coat was cut along ten longitudinal and transverse parallel lines spaced 1 mm to define a cross-hatch pattern of 100 sections. Adhesive tape was attached to the coat under pressure and quickly peeled therefrom. The coat was evaluated by visually observing how many coat sections were separated.

Good: no separation

Fair: some sections separated off

Poor: many sections separated off (2) Repetitive hitting test

Using a hitting machine (True Temper Co.) equipped with a driver club, the coated golf ball was hit 200 times at a head speed of 45 m/s. The ball was evaluated by visually observing how the coat was separated.

Good: no separation

Fair: partial separation

Poor: separation over a wide area (3) Abrasion test

A 4-liter pot mill was charged with the balls and abrasive grit (Shorel Nugget SN, size 5S, by Showa Denko K.K.). The mill was operated at 30 rpm for 2 hours. The ball was evaluated by visually observing how the coat was separated.

Good: no separation

Fair: partial separation

Poor: separation over a wide area (4) Water resistance test

At room temperature (23° C.), the ball was immersed in water (water temperature about 18° C.) for 48 hours. The ball was evaluated by visually observing the coat.

Good: no change

Poor: blistered, even slightly (5) Drying test

The paint applied to the golf ball was dried under predetermined conditions (temperature 45° C., time 1 hour). Immediately after drying, the surface of the coat was examined for tack.

Good: fully dry (tack-free and not sticky)

Fair: tacky

Poor: sticky

TABLE 1

| | | Example | | | | | | | | | |
|---|---|---|---|---|---|---|---|---|---|---|---|
| | | 1 | 2 | 3 | 4 | 5 | 6 | 7 | 8 | 9 | 10 |
| Composition (pbw) | Paint type | clear | clear | clear | clear | clear | clear | clear | clear | clear | white enamel |
| | Polyol resin type | polyester | acrylic | polyether | polyester | polyester | polyester | polyester | polyester | polyester | polyester |
| | OH value | 160 | 120 | 150 | 160 | 160 | 160 | 160 | 160 | 160 | 160 |
| | Curing agent type | HMDI-bullet | HMDI-bullet | HMDI-bullet | HMDI-TMP adduct | HMDI-bullet | HMDI-bullet | HMDI-bullet | HMDI-bullet | HMDI-bullet | HMDI-bullet |
| | Blend ratio NCO/OH | 1.2 | 1.2 | 1.2 | 1.2 | 1.2 | 1.2 | 1.2 | 1.2 | 1.2 | 1.2 |
| | Solid content (wt %) | 30 | 30 | 30 | 30 | 30 | 30 | 30 | 30 | 30 | 38 |
| | Zinc octylate | 0.2 | 0.2 | 0.2 | 0.2 | 0.1 | 0.5 | 0.2 | — | — | 0.2 |
| | Dibutyltin dilaurate | — | — | — | — | — | — | — | 0.001 | 0.005 | — |

TABLE 1-continued

|  |  | Example | | | | | | | | | |
|---|---|---|---|---|---|---|---|---|---|---|---|
|  |  | 1 | 2 | 3 | 4 | 5 | 6 | 7 | 8 | 9 | 10 |
|  | Acetylacetone | 2 | 2 | 2 | 2 | 2 | 2 | — | 2 | 2 | 2 |
|  | Trifluoro-acetylacetone | — | — | — | — | — | — | 2 | — | — | — |
| Physical properties | Pot life | Good | Good | Good | Good | Good | Good | Good | Good | Good | Good |
|  | Drying | Good | Good | Good | Good | Good | Good | Good | Good | Good | Good |
|  | Adhesive tape test | Good | Good | Good | Good | Good | Good | Good | Good | Good | Good |
|  | Repetitive hitting test | Good | Good | Good | Good | Good | Good | Good | Good | Good | Good |
|  | Abrasion test | Good | Good | Good | Good | Good | Good | Good | Good | Good | Good |
|  | Water resistance test | Good | Good | Good | Good | Good | Good | Good | Good | Good | Good |

TABLE 2

|  |  | Comparative Example | | | |
|---|---|---|---|---|---|
|  |  | 1 | 2 | 3 | 4 |
| Composition (pbw) | Paint type | clear | clear | clear | clear |
|  | Polyol resin type | polyester | polyester | polyester | polyester |
|  | OH value | 160 | 160 | 160 | 160 |
|  | Curing agent type | HMDI-bullet | HMDI-bullet | HMDI-bullet | HMDI-bullet |
|  | Blend ratio NCO/OH | 1.2 | 1.2 | 1.2 | 1.2 |
|  | Solid content (wt %) | 30 | 30 | 30 | 30 |
|  | Zinc octylate | 0.0 | 1.2 | — | — |
|  | Dibutyltin dilaurate | — | — | 0.001 | 0.03 |
|  | Acetylacetone | — | — | — | — |
|  | Trifluoro-acetylacetone | — | — | — | — |
| Physical properties | Pot life | Good | Poor | Fair | Poor |
|  | Drying | Poor | Good | Poor | Good |
|  | Adhesive tape test | not tested | Good | not tested | Good |
|  | Repetitive hitting test | not tested | Good | not tested | Good |
|  | Abrasion test | not tested | Good | not tested | Good |
|  | Water resistance test | not tested | Good | not tested | Good |

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A golf ball coating composition comprising,
   a two-part curable urethane paint consisting essentially of a polyol and a polyisocyanate,
   a metal chelating agent having a boiling point of up to 200° C., and
   an organometallic compound as a curing catalyst.

2. The composition of claim 1 wherein the metal chelating agent has a boiling point of up to 150° C.

3. The composition of claim 1 wherein the metal chelating agent is acetylacetone or a fluorinated derivative thereof.

4. The composition of claim 1 wherein the metal moiety of the organometallic compound is tin or zinc.

5. A golf ball coated with the composition of claim 1.

6. The composition of claim 1, wherein the polyisocyanate is a non-yellowing polyisocyanate.

7. The composition of claim 1, wherein the polyisocyanate is selected from the group consisting of tolylene diisocyanate, xylylene diusocyanate, isophorone diisocyanate and hexamethylene diisocyanate.

8. The composition of claim 1, wherein said metal chelating agent is selected from the group consisting of β-diketones, keto-esters, hydroxycarboxylic acids and esters thereof, keto-alcohols, and enolic active hydrogen compounds.

9. The golf ball of claim 5, wherein the metal chelating agent has a boiling point of up to 150° C.

10. The golf ball of claim 5, wherein the metal chelating agent is acetylacetone or a fluorinated derivative thereof.

11. The golf ball of claim 5, wherein the metal moiety of the organometallic compound is tin or zinc.

* * * * *